United States Patent Office 3,223,749
Patented Dec. 14, 1965

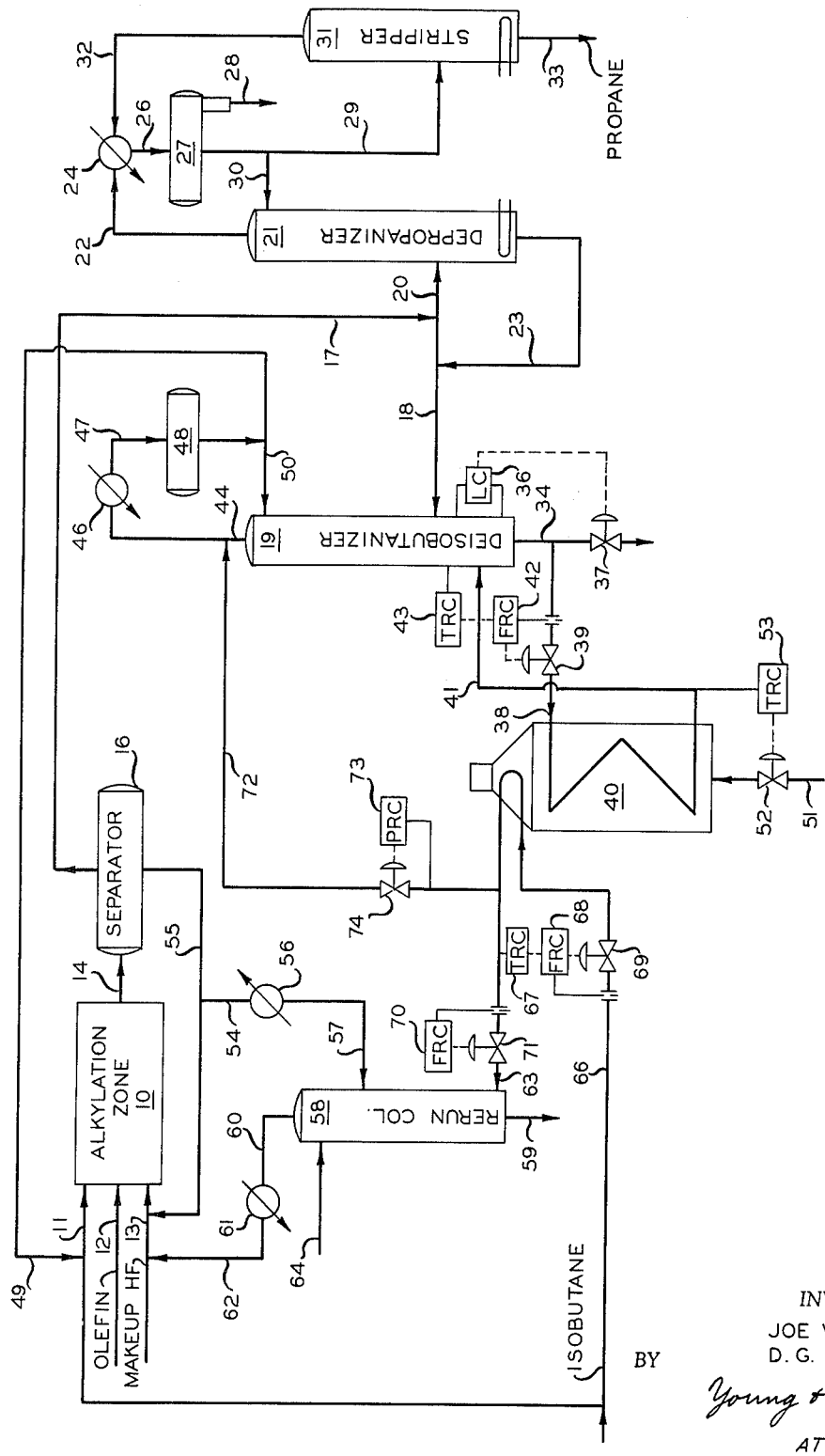

3,223,749
HF ALKYLATION AND ACID RERUN PROCESS
Joe Van Pool and Dave G. Blaker, Bartlesville, Okla., assignors to Phillips Petroleum Company, a corporation of Delaware
Filed Oct. 1, 1962, Ser. No. 227,149
3 Claims. (Cl. 260—683.48)

This invention relates to an improved HF alkylation and acid rerun process. In another aspect, this invention relates to an improved HF alkylation and acid rerun process and apparatus therefor wherein the isoparaffin fractionation zone reboiler is employed to heat an isoparaffin feedstream passed to the acid regeneration zone.

The catalytic alkylation of an olefin with an isoparaffin to form high-octane gasoline boiling range products is well known in the art. In a conventional alkylation process, an olefin feed comprising propylene and butylenes is passed with isobutane to an alkylation zone wherein the olefin and isobutane feed are contacted with liquid hydrofluoric acid, said hydrofluoric acid acting as an alkylation catalyst. The alkylation zone hydrocarbon effluent is separated from the acid catalyts and fractionally separated with the isobutane and lighter hydrocarbon fraction recycled to the alkylation zone.

While employed as an alkylation catalyst, the hydrofluoric acid becomes diluted due to its tendency to dissolve water entrained in the hydrocarbons being treated and/or water that is produced in the reaction mixture during the processing thereof. Moreover, the frequent occurrence of side reactions while the hydrocarbon is undergoing the reaction results in the formation of organic fluorides and acid-soluble oils, thereby diluting the hydrofluoric acid still further. It is desirous for reasons of economy that the hydrofluoric acid employed in the alkylation reaction be recovered and continuously recycled to the alkylation zone. It is required, therefore, that the dilute hydrofluoric acid separated from the alkylation zone hydrocarbon effluent be processed so that the diluents contained or combined therein can be removed from the hydrofluoric acid in order that the catalytic effectiveness of the hydrofluoric acid not be impaired.

HF alkylation processes have conventionally been comprised of independent process steps—(1) alkylation to include hydrocarbon effluent separation, and (2) acid rerun or recovery. We have discovered an improved HF alkylation process wherein the acid rerun process step is combined with the hydrocarbon effluent separation process step to reduce process heat requirements and thus substantially reduce the cost of the alkylation process.

Accordingly, an object of our invention is to provide an improved HF alkylation and acid rerun process and apparatus therefor.

Another object of our invention is to reduce the heat requirements conventionally required in the hydrocarbon effluent and acid rerun process steps.

Other objects, advantages and features of our invention will be readily apparent to those skilled in the art from the following description and the appended claims.

The process of this invention is applicable to the catalytic alkylation of a low-boiling olefin with a low-boiling isoparaffin, said low-boiling olefin having 3 to 5 carbon atoms per molecule and said low-boiling isoparaffin having 4 or 5 carbon atoms per molecule. The catalyst employed in the process of this invention comprises a hydrofluoric acid catalyst, said hydrofluoric acid catalyst to include those hydrofluoric acid catalysts containing boron fluoride.

The drawing is a schematic representation of one embodiment of the inventive process.

Referring to the drawing, the process will hereinafter be described as applied specifically to an olefin feed comprising propylene and butylenes and an alkylating agent comprising isobutane, although it is not intended that the invention should be limited thereto. Fresh isobutane is passed via conduit means 11 to alkylation zone 10. A recycle isobutane stream from a source hereinafter described is combined with the isobutane stream in conduit 11 and passed to alkylation zone 10. Hydrofluoric acid catalyst is introduced to alkylation zone 10 via conduit means 13. A recycle catalyst stream from a source hereinafter described is combined with the hydrofluoric acid catalyst in conduit means 13 and passed to alkylation zone 10.

Conventional alkylation conditions are maintained within alkylation zone 10. For example, with the olefin feed comprising propylene and butylenes, the alkylating agent comprising isobutane and the catalyst comprising hydrofluoric acid, the temperature of the alkylation zone 10 is preferably maintained in the range of between about 85–105° F. with the pressure of alkylation zone 10 sufficient to maintain a liquid phase reaction. The volume measure of acid to hydrocarbon maintained in the alkylation zone 10 is preferably in the range from about 8:1 to 0.8:1.

The alkylation zone effluent mixture is passed via conduit means 14 to a phase separator 16 wherein the acid catalyst is separated from the hydrocarbon phase. The hydrocarbon phase is withdrawn from phase separator 16 via conduit means 17 and passed via conduit means 18 to a deisobutanizing column 19.

The presence of inert materials such as propane in the alkylation zone substantially decreases the efficiency of the alkylation process. Therefore, it is desirable that the passage of inert materials such as propane to the alkylation zone be controlled and the production of inert materials such as propane in the alkylation zone be minimized.

The buildup of the propane concentration in the alkylation zone can be controlled by splitting the hydrocarbon effluent recovered from the alkylation zone and passing a portion of the hydrocarbon effluent to a depropanizer wherein the materials comprising propane and lower-boiling hydrocarbons are recovered and removed from the alkylation process. Accordingly, a portion of the hydrocarbon phase withdrawn from phase separator 16 is passed via conduit means 17 and conduit means 20 to depropanizer 21.

Within depropanizer 21, the hydrocarbon feedstream is fractionated into a propane and lighter fraction withdrawn from depropanizer 21 via conduit means 22 and a hydrocarbon fraction withdrawn from depropanizer 21 via conduit means 23. The hydrocarbon fraction withdrawn from the bottom of depropanizer 21 via conduit means 23 is combined with the hydrocarbon feedstream to deisobutanizer 19.

A vaporous overhead stream withdrawn from depropanizer 21 via conduit means 22 is condensed via heat exchange means 24 and passed via conduit means 26 to an accumulator 27. A liquid stream is withdrawn from the bottom of accumulator 27 via conduit means 29 and a portion of said liquid stream recycled via conduit means 30 to depropanizer 21 as reflux. The remainder of the stream withdrawn from accumulator 27 is passed to a conventional stripper 31. A vaporous stream is withdrawn from the top of stripper 31 via conduit means 32, condensed via heat exchange means 24 and passed via conduit means 26 to accumulator 27. A propane product stream is withdrawn from the bottom of stripper 31 via conduit means 33. Accumulator 27 contains an acid leg. The hydrofluoric acid accumulating in accumulator 27 is withdrawn from the acid leg via conduit means 28.

This can be returned to the reaction zone 10 by a means not herein illustrated.

The depropanizer can be operated at a bottom temperature and pressure in the range of 220–240° F. and in the range of 250–280 p.s.i.g., respectively.

Within disobutanizer 19, the hydrocarbon feedstream is separated into a fraction comprising isobutane and lighter components and an alkylate-containing fraction. The bottom temperature and pressure of deisobutanizer 19 are generally maintained in the range of 250–290° F. and in the range of 100–125 p.s.i.g., respectively. The hydrocarbon stream comprising n-butane and alkylate is withdrawn from the bottom of deisobutanizer 19 via conduit means 34. The rate of flow conduit 34 is controlled by a conventional liquid level controller 36, said liquid level controller 36 sensing the liquid level within deisobutanizer 19 and opening or closing a conventional control valve 37 responsive thereto. The n-butane and alkylate stream can be further fractionated in a conventional fractionation zone to provide an n-butane fraction and alkylate.

A portion of the n-butane-alkylate stream withdrawn from deisobutanizer 19 via conduit means 34 is passed via conduit means 38 and control valve 39 to a fired reboiler 40. The n-butane and alkylate stream passed to fired reboiler 40 via conduit means 38 is heated within said reboiler and recycled via conduit means 41 to deisobutanizer 19, thereby maintaining the desired fractionation temperature within deisobutanizer 19. The rate of flow through conduit means 38 is controlled by conventional flow-recorder-controller 42, which manipulates control valve 39 responsive to a rate of flow measurement in conduit 38 and a reset signal received from a conventional temperature-recorder-controller 43. Temperature-recorder-controller 43 senses the temperature within deisobutanizer 19 and resets flow-recorder-controller 42 responsive thereto.

Organic fluorides contained within the n-butane and alkylate stream passed to fired reboiler 40 are decomposed within fired reboiler 40, and decomposition products recycled to deisobutanizer 19 and withdrawn from deisobutanizer 19 via conduit means 44.

A vaporous stream is withdrawn from deisobutanizer 19 via conduit means 44, condensed via heat exchange means 46, and passed to an accumulator 48 via conduit 47. A liquid isobutane-containing stream is withdrawn from accumulator 48 via conduit means 49 and a portion of the withdrawn stream passed via conduit means 50 as reflux to deisobutanizer 19. The remainder of the liquid isobutane-containing stream withdrawn from accummulator 48 is recycled via conduit means 49 to alkylation zone 10 via conduit means 11. The n-butane and alkylate hydrocarbon stream withdrawn from deisobutanizer 19 via conduit means 37 is passed to a conventional hydrocarbon separation process such as a debutanizing fractionation zone wherein alkylate is separate from the hydrocarbon stream withdrawn from deisobutanizer 19.

Reboiler 40 is fired by passing a fuel via conduit means 51 to conventional burners within fired reboiler 40. The rate of flow of fuel to said burners is controlled by a conventional temperature-recorder-controller 53 opening and closing control valve 52 responsive to a temperature measurement of the n-butane and alkylate effluent flow from fired reboiler 40.

An acid phase is withdrawn from phase separator 16 via conduit means 53. A portion of the acid phase is passed via conduit means 54 to a heat exchange means 56 wherein said acid phase is heated. A vaporous and liquid mixture is passed from heat exchange means 56 via conduit means 57 to the upper region of return column (acid regeneration zone) 58. The temperature of the mixture passed to rerun column 58 via conduit means 57 is preferably in the range of 290–300° F. Preferably, the acid phase is passed to regenerator 58 such that the hydrogen flouride contained therein is vaporized upon entering regenerator 58.

Within rerun column 58, hydrogen fluoride is separated from the acid-soluble oils and water and withdrawn from rerun column 58 via conduit means 60. The acid-soluble oils and water are withdrawn from rerun column 58 via conduit means 59. Vaporous isobutane employed as the stripping medium is passed via conduit means 63 to rerun column 58. Contact trays or other baffling means of effecting intimate contact between the stripping vapor and the down-flowing condensed acid-soluble oils and water is provided between conduit inlet means 57 and conduit inlet means 63. To aid in the separation of hydrogen fluoride, a liquid isobutane stream is passed to the top of rerun column 58 via conduit inlet means 64. A contact tray, such as a perforated tray, is positioned between conduit inlet means 57 and conduit inlet means 64. The bottom temperature and pressure of rerun column 58 is maintained in the range of about 240–280° F. and in the range of 100–140 p.s.i.g., respectively. The method of heating rerun column 58 comprises heating the stripping isobutane vapor passed to column 58 prior to passage of such stripping vapor to said column 58, said method of heating hereinafter described.

The liquid or vaporous isobutane passed to rerun column 58 is withdrawn via conduit means 60 from rerun column 58 as a vapor with the vaporous hydrogen fluoride and the vaporous mixture condensed via heat exchange means 61. The condensed mixture is recycled via conduit means 62 and conduit means 13 to alkylation zone 10. Makeup hydrogen fluoride is passed to alkylation zone 10 via conduit means 13 as required.

The liquid isobutane passed to rerun column 58 via conduit means 64 condenses the acid-soluble oils and water in the feed to rerun column 58. It is within the scope of this invention to substitute other conventional means of condensing the acid-soluble oils and water such as condensing coils positioned in the upper region of rerun column 58.

The stripping isobutane employed in rerun column 58 is preheated by passing isobutane via conduit means 66 to the convection section of fired reboiler 40 and from fired reboiler 40 via conduit means 63 to rerun column 58 in the heretobefore described manner. The temperature of the effluent flowing from fired reboiler 40 via conduit means 63 is sensed by a conventional temperature-recorder-controller 67. Temperature-recorder-controller 67 transmits a reset signal responsive to said temperature measurement and a set point to a conventional flow-recorder-controller 68. Flow-recorder-controller 68 opens and closes valve 69 responsive to this reset signal and to a rate of flow measurement in conduit 66 so as to maintain the temperature of the isobutane flowing to rerun column 58 at the desired level. Preferably, the temperature of the isobutane flowing to rerun column 58 is maintained at about 400° F.

Reboiler heat which would otherwise be lost or wasted is utilized to preheat the stripping isobutane, thereby effecting a substantial saving in operational cost. Heating isobutane in fired reboiler 40 will require only about 250,000 B.t.u.'s per hour whereas the heat requirements for deisobutanizer 19 will be about 15,000,000 B.t.u.'s per hour for a typical alkylation process.

The rate of flow of stripping isobutane to rerun column 58 is controlled by conventional flow-recorder-controller 70. Flow-recorder-controller 70 opens and closes control valve 71 so as to maintain the rate of flow of stripping isobutane to rerun column 58 substantially constant. The remainder of the isobutane flowing from fired reboiler 40 via conduit means 63 is passed via conduit means 72 and conduit means 44 to heat exchange means 46 and thence to alkylation zone 10 with the recycled isobutane in the previously described manner. The rate of flow of isobutane through conduit means 72 is controlled by conventional pressure-recorder-controller 73, which senses the pressure in conduit means 72 or 63 and opens and closes valve means 74 responsive thereto.

As a safety measure, flow-recorder-controller 68 can be provided with a low rate alarm to guard against the tubes in the convection section becoming overheated with a low rate of isobutane flow.

The convection coil within fired reboiler 40 is oversized to supply the heat required by rerun column 58 when the deisobutanizer reboiler furnace load is low. An excess of isobutane through this convection coil over that amount required by rerun column 58 passes to deisobutanizer overhead condenser 46 (and ultimately to alkylation zone 10) in the previously described manner. As previously noted, this quantity charged to the condenser is on pressure control which not only relieves the excess isobutane to the condenser, but also maintains constant pressure on the orifice of this vaporized isobutane being fed to rerun column 58. With constant temperature and pressure at this point, measurement of vapor volume by flow-recorder-controller 70 is directly related to the heat added to rerun column 58.

As will be evident to those skilled in the art, various modifications of this invention can be made, or followed, in the light of the foregoing disclosure and discussion without departing from the spirit or scope thereof.

We claim:

1. In an alkylation process which comprises contacting a low-boiling isoparaffin with a low-boiling olefin in an alkylation zone, passing an effluent from said alkylation zone to a separation zone, withdrawing a hydrocarbon phase from said separation zone, passing at least a portion of said hydrocarbon phase to a fractionation zone, passing said low-boiling isoparaffin from the upper region of said fractionation zone to said alkylation zone, withdrawing alkylate from the lower region of said fractionation zone, heating a portion of said withdrawn alkylate in a fired reboiler, passing heated alkylate from said fired reboiler into the lower region of said fractionation zone, withdrawing an acid phase from said separation zone, and passing at least a portion of said withdrawn acid phase to a regeneration zone; the improvement which comprises passing said low-boiling isoparaffin through a conduit means positioned within the convection section of said fired reboiler, thereby heating said low-boiling isoparaffin, passing at least a portion of said heated low-boiling isoparaffin from said convection section into the lower region of said regeneration zone, withdrawing the remainder of said heated low-boiling isoparaffin from said convection section as a product stream responsive to a measurement representative of the pressure within said conduit means, thereby maintaining the pressure within said conduit means substantially constant, measuring a property of said heated low-boiling isoparaffin flowing from said convection section representative of the temperature thereof, manipulating the rate of flow of said low-boiling isoparaffin to said convection section responsive to said temperature measurement, passing hydrogen fluoride and low-boiling isoparaffin stream from the upper region of said regeneration zone to said alkylation zone, and withdrawing from said regeneration zone acid-soluble oils.

2. In an alkylation process which comprises contacting a low-boiling isoparaffin with a low-boiling olefin in an alkylation zone, passing an effluent from said alkylation zone to a separation zone, withdrawing a hydrocarbon phase from said separation zone, passing at least a portion of said hydrocarbon phase to a fractionation zone, passing said low-boiling isoparaffin from the upper region of said fractionation zone to said alkylation zone, withdrawing alkylate from the lower region of said fractionation zone, heating a portion of said withdrawn alkylate in a fired reboiler, passing heated alkylate from said fired reboiler to the lower region of said fractionation zone, withdrawing an acid phase from said separation zone, and passing at least a portion of said withdrawn acid phase to a regeneration zone; the improvement which comprises passing said low-boiling isoparaffin through a conduit means positioned within the convection section of said fired reboiler, thereby heating said low-boiling isoparaffin, passing said heated low-boiling isoparaffin from said convection section to the lower region of said regeneration zone and to said alkylation zone, in combination with said low-boiling isoparaffin withdrawn from the upper region of said fractionation zone manipulating the rate of flow of said heated low-boiling isoparaffin from said convection section to said alkylation zone responsive to a measurement representative of the pressure within said conduit means, thereby maintaining the pressure within said conduit means substantially constant, measuring a property of said heated low-boiling isoparaffin flowing from said convection section representative of the temperature thereof, manipulating the rate of flow through said conduit means responsive to said temperature measurement, passing a hydrogen fluoride and low-boiling isoparaffin stream from the upper region of said regeneration zone to said alkylation zone, and withdrawing from said regeneration zone acid-soluble oils.

3. The process of claim 2 wherein said low-boiling isoparaffin comprises isobutane and said low-boiling olefin comprises propylene and butylenes.

References Cited by the Examiner

UNITED STATES PATENTS

| 2,089,616 | 8/1937 | McKee | 208—107 |
| 2,636,912 | 4/1953 | Leatherman | 260—683.42 |
| 2,914,590 | 11/1959 | Van Pool | 260—683.48 |
| 2,984,693 | 5/1961 | Cabbage | 260—683.42 |
| 3,019,273 | 1/1962 | DeLano et al. | 260—683.42 |

ALPHONSO D. SULLIVAN, *Primary Examiner.*